Patented Mar. 9, 1937

2,072,971

UNITED STATES PATENT OFFICE 2,072,971

PROCESS FOR THE MANUFACTURE OF CONDENSATION PRODUCTS FROM NON-ALIPHATIC SULPHAMIDES AND ALDEHYDES

Georg Walter, Vienna, Austria

No Drawing. Application July 11, 1932, Serial No. 622,010. In Austria July 20, 1929

28 Claims. (Cl. 260—3)

This invention relates to the manufacture of condensation products from non-aliphatic sulphamides and aldehydes.

It is known to condense arylsulphamides and their N-monoalkyl-substiution products with formaldehyde. Soluble and fusible artificial resins are obtained thereby, which products, however, cannot be hardened contrarily to the property of phenol-formaldehyde condensation products and of the urea-formaldehyde condensation products, that is to say they cannot be converted into the insoluble and infusible state by the action of heat.

The present invention is based on the discovery that artificial resins capable of being hardened can be obtained by condensing sulphamides of cyclic organic compounds with aldehydes, provided that the sulphamides are such that contain at least one carbamyl group (CONH$_2$). Further investigations have shown, that the said result is not limited to the presence of the carbamyl group in the cyclic sulphamides. On the contrary, numerous experiments have shown the essential condition, that the process must be started from compounds which contain besides the sulphamyl group in the molecule a second or several NH$_2$ groups in any manner of binding (combination whatever). In conformity thereto the process according to the present invention consists in condensing sulphamides of cyclic organic compounds containing besides the sulphamyl group at least one substituted or non-substituted NH$_2$ group, with aldehydes and particularly with formaldehyde (CH$_2$O).

For the commercial manufacture of the new products by-products of the saccharine manufacture such as for instance parasulphamidobenzoic acid

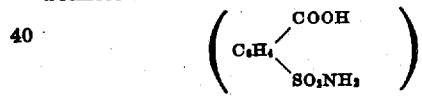

the carboxyl group (—COOH) of which acid is aminated, may besides other materials be used as a cheap primary material. The compounds thus obtained, which contain the carbamyl group besides the sulphamyl group, are brought to react with formaldehyde.

According to one mode of carrying the invention into practice disulphamides, trisulphamides or other polysulphamides are used as primary material, wherein, as is understood, the second and/or the further NH$_2$ groups are also present in the form of sulphamyl groups. Besides the sulphamyl groups also other NH$_2$ groups, especially also the carbamyl group may be present.

The reaction, when carried out by applying heat, leads finally to products which are insoluble and infusible. Resins are obtained as intermediate products, which are soluble in organic solvents and give water clear lacquers. By hardening the intermediate products in the heat and eventually under pressure, the glass-like hard final products are obtained therefrom. Also by condensation in the cold in the presence of catalysts, for instance of strong bases or acids intermediate products are obtained, which can be brought into the final state by hardening.

The increase of the NH$_2$ groups, which evidently renders possible the course of the reaction in the sense of the invention, can also be effected by introducing one or several sulphamyl groups into aniline (C$_6$H$_5$NH$_2$), phenylendiamine (C$_6$H$_4$(NH$_2$)$_2$) or into similar compounds, and condensing the latter with formaldehyde.

The products obtained by the present process are, after the hardening has taken place, elastic, infusible and insoluble resins, which may be utilized as artificial masses for various purposes, e. g. as material for turnery ware.

The condensation products may also be worked up into molding compositions with or without the addition of fillers, particularly of fibrous materials.

The products obtained by the present process are not only by their properties but also by their chemical composition distinguished from the resins obtained by the formaldehyde condensation of monosulphamides containing no further NH$_2$ groups, which are not capable of being hardened. As the primary materials contain more than one NH$_2$ group, each of these groups can react with the formaldehyde so that the linking up can lead to molecules which are built up differently and greater than those obtained for instance by the condensation of p-toluolsulphamide

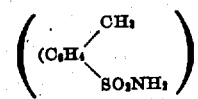

with formaldehyde.

By the new process resins of quite varying compositions can be produced, as the possibility of variation is exceedingly great according to the primary material chosen (benzol, and homologues, aniline, carbazol etc.), according to the number and the position (in the core o, m, p or in the side-chain) and also according to the manner of binding of the amido groups, of the substituents in the core or on the nitrogen,—the latter being present for instance also in the form of an imido group (—NH—). This possibility is still increased by the fact, that mixing of different or isomeric sulphamides and the like gives in the condensation not only mixtures, but new compounds, so that final products are yielded, which are also new with respect to the chemical composition.

Besides aromatic compounds hydroaromatic or heterocyclic compounds may also be used, as primary material, provided that they answer the above indicated conditions. Carbazoltetrasulphamide may be named as an example. The compounds may also be polynuclear, in which case condensed rings (for instance naphthalene) may be brought to condensation with aldehydes or also ring systems linked directly or by means of any groups and containing in total besides at least one sulphamyl group at least one further $NH_2$ group in any binding whatever. Of these polynuclear compounds may be named for instance polysulphaminated sulfones, e. g. diphenyl-sulfondisulphamide $$(C_6H_4SO_2C_6H_4(SO_2NH_2)_2),$$

polysulphaminated benzophenone and the like.

The condensation may be effected either in the presence of solvents or without them, in the later case for instance by melting. Aqueous liquids as well as organic liquids may be used as solvents. Formaldehyde may be employed in a solution or as gas or as polymeric formaldehyde or in the form of substances splitting off formaldehyde, for instance hexamethylenetetramine $((CH_2)_6N_4)$. Moreover in certain cases instead of formaldehyde other aldehydes may be used, for instance furfurol. Preferably equivalent or approximately equivalent amounts of formaldehyde are employed, calculated on each $NH_2$ group present.

The condensation may be carried out in the presence of catalysts. Acids as well as bases act as contacting agents. Moreover first of all initial condensation products may be made, for instance methylol compounds such as—

or methylene derivatives of the amides such as—

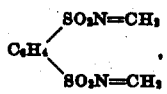

either in crystalline or amorphous form, and then converted into the resins by heating in solution or in absence of solvents by melting. Furthermore the process may be carried out in such a manner that the reaction is in the first stage conducted neutral or alkaline by means of substances having a basic action (KOH, hexamethylenetetramine, salts having an alkaline reaction), in which case evidently first of all methylol compounds are formed, and the condensation is then in a second stage conducted acid, using acid, acid salts, esters, or else merely continuing the heating or by means of oxidizing agents. The acid may then be fully or partly neutralized.

During or after the condensation, formaldehyde binding substances, such as phenols, urea, thiourea or amines may be added to the reaction mixture. Such compounds forming resins with formaldehyde may also from the very beginning be added and subjected to the common condensation. In certain cases mono-amides (for instance p-toluol-sulphamide) may be incorporated with the mass during the operation. They also form resins with formaldehyde, although these resins are not capable of being hardened. If larger amounts of mono-amides are added, final products are obtained, which have a high melting point, but are not any more capable of being hardened. These products are soluble in organic solvents.

The properties of the products thus obtained may furthermore be modified by incorporation of other, artificial or natural resins, cellulose esters, cellulose-ethers or other plastic masses. In this manner products are obtained which can be worked up with oils or cellulose derivatives to give excellent lacquers. It should also be stated that while for the sake of uniformity of phraseology I have frequently used the term "urea" herein, I desire it to be understood, as clearly within the intended scope of this disclosure, that such equivalent substitutes as thiourea or homologues of urea and thiourea may be employed in lieu thereof with practically unchanged results.

*Examples*

1. p-sulphamidobenzamide—

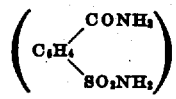

is condensed with the equivalent amount of formaldehyde (that is to say with two molecules of formaldehyde to one molecule of the amide) at boiling temperature in an apparatus with a reflux condenser. If boiling is not continued for a too long time the solution soon generated remains homogeneous and is after suitable thickening as far as possible freed from water. The resin still containing water is white in the cold and clear in the heat. It can be hardened by further heating and furnishes according to the degree of hardening a clear, supple and still soluble or a hard infusible and insoluble product.

The intermediate product obtained prior to the hardening is soluble in many of the usual organic solvents such as alcohol, benzol, acetone and the like, and particularly also in mixtures of solvents. These solutions give transparent and colorless lacquers.

If a small amount of acid is added as condensing agent, the condensation proceeds considerably quicker and yields a hydrophobe resin, which gelatinizes on further heating.

2. 350 grams of m-benzol-disulphamide

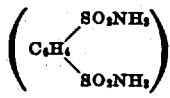

are introduced into 240 cubic centimeters of a 40% formaldehyde solution (to each $SO_2NH_2$ group one $CH_2O$ group). The mixture is heated up to boiling temperature. If the dissolution has taken place, heating is continued for about 15 minutes, whereafter the generated condensation product separates on cooling as a tough, brilliant white opaque resin. The product is washed and gives, when dissolved in alcohol, a light lacquer. For obtaining a glass-like final product it has to be hardened for longer time at 80° to 100° C. The final product thus obtained is colorless, transparent, infusible and insoluble. Prior to the hardening, the resin may, by heating in a vacuum, be partly freed from the water contained therein.

If the condensation is continued for a period longer than indicated above, an intermediate product is obtained, which is more tough, and not soluble any more in alcohol, but in acetone.

3. 250 grams of m-benzol-disulphamide are mixed with 180 cubic centimeters of a 40% formaldehyde solution, adding also such an amount of acid, that the hydrogen ion concentration in the solution will amount to about $5.10^{-3}$. The mixture is boiled for about three quarters of an hour, whereafter the solution separates still in the heat into an aqueous and an oily layer. The latter furnishes after cooling a product similar to that obtained by the mode according to Example 2.

4. 0.2 grams of KOH are dissolved in 100 cubic centimeters of alcohol. Into this solution there are introduced 26 grams of paraformaldehyde and 100 grams of m-benzol-disulphamide. The solution is heated and acidulated. After the condensation will be accomplished, about 20% acetone is added to the solution of resin thus obtained. A lacquer of excellent qualities is obtained thereby.

5. 5 grams of xyloldisulphamide—

which has been prepared from commercial xylol and constitutes a mixture of isomeres, are condensed with an equivalent amount of formaldehyde. The hardened final product is a transparent hard resin, which is more brittle than that made from benzoldisulphamide.

6. In a half-normal (0,5 N) alcoholic KOH solution equivalent amounts of formaldehyde and of benzol disulphamide are introduced. After 10 minutes a resin will separate from the solution even in the cold state. The resin thus obtained is in this state still soluble in water and can be hardened by the action of heat.

7. If instead of the m-benzol-disulphamide a monochlorbenzoldisulphamide—

or a dichlorbenzoldisulphamide—

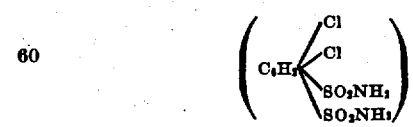

is used, solid condensation products are obtained, capable of being hardened, but impaired transparency.

8. m-Toluoldisulphamide—

yields a resin similar to that from xyloldisulphamide.

9. Aniline trisulphamide—

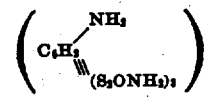

is brought to react with equivalent amounts of formaldehyde. The resin obtained thereby can be hardened, but gives brittle and clouded final products.

10. Similar products are obtained, if acetanilid-p-sulphamide—

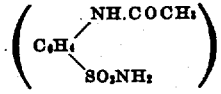

is brought to react with one or two mols. of formaldehyde, or p-toluiline-disulphamide—

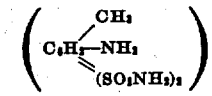

with two or three mols. of formaldehyde.

11. m-Benzoldisulphamide is condensed with CH₂O as set forth in Example 2. A short time before the condensation is accomplished, further 20% of benzoldisulphamide are added and the condensation is continued. The product obtained after hardening shows a very high degree of hardness.

12. 7 grams of benzoldisulphamide are dissolved in 4.42 cubic centimeters of a 40% formaldehyde solution in the cold, adding also 22 cubic centimeters of KOH. So much of 2NHCl is added, until the precipitation setting in will be accomplished. The precipitate is first a resin-like, then a cheese-like product, which is washed with water and then dried in vacuo. A white amorphous powder is obtained thereby, which readily furnishes a spirit lacquer. Moreover this powder can be subjected to hot pressing, either for itself alone or with filling materials, (for instance cellulose).

13. From phenol-disulphamide—

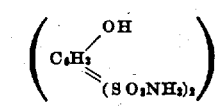

and formaldehyde a resinous condensation product can also be obtained.

14. A 70% acetone lacquer (prepared by dissolving the intermediate condensation product of benzoldisulphamide and CH₂O) is caused to be sucked up by cellulose, the mass is hardened at 100° C., finely pulverized and the powder used for hot pressing. A hard, transparent product of horn like appearance is obtained.

15. m-Benzol-disulphamide is mixed with about 20% of p-toluolmonosulphamide and to the mixture such an amount of formaldehyde is added, that one mol. of CH₂O comes to each of the NH₂ groups present in the mixture. After the condensation a product is obtained melting at a high melting point, which product is still soluble in organic solvents.

16. m-Benzol-disulphamide is heated with formaldehyde. After some time 10 to 20% of thiourea are added to the solution. The resin which separates after the heating has been continued for short time, shows an increase of the hydrophobe properties in comparison with the resin produced under the same conditions, but without the addition of thiourea.

Two different products are obtained according to the amounts of formaldehyde used for the condensation, either such as are equivalent to the benzol-disulphamide or in equivalent relation to all the NH₂ groups present, consequently also to those of the thiourea. In the latter case a homogeneous mixed condensation product is obtained.

What I claim is:

1. A process for producing resin-like reaction products which comprises the step of condensing an aldehyde with a sulphamide of a cyclic organic compound containing besides at least one substituted or unsubstituted sulphamyl group (SO₂NH₂) a group containing a substituted or unsubstituted NH₂ radical or a substituted or unsubstituted NH₂ group itself, at least one of the sulphamyl or NH₂ groups being unsubstituted.

2. A process as defined in claim 1, wherein the condensation is carried to such a stage that hardened products are formed.

3. A process as defined in claim 1, wherein the condensation is carried out to an intermediate stage at which a condensation product capable of being hardened is formed and converting such product into an infusible final product by the action of heat and pressure.

4. A process as defined in claim 1, wherein the sulphamide compound contains besides the sulphamyl group at least one carbamyl (CONH₂) group.

5. A process as defined in claim 1, wherein the condensation is carried out in the presence of an aldehyde binding substance selected from the following group:—phenols, urea, thiourea, amines and monamides.

6. A process as defined in claim 1, wherein there are at least two unsubstituted sulphamyl groups.

7. A process as defined in claim 1, wherein the condensation is carried out to an intermediate stage at which a condensation product capable of being hardened is formed and converting such product into an infusible final product by the action of heat alone.

8. A process for producing resin-like reaction products which comprises the step of condensing an aldehyde with a sulphamide of a cyclic organic compound containing besides an unsubstituted sulphamyl (SO₂NH₂) group, a group containing a substituted or unsubstituted NH₂ radical.

9. A process of producing resin-like reaction products which comprises the steps of condensing an aldehyde with a sulphamide of a cyclic organic compound in an alkaline medium to produce a product which can be hardened and then continuing the condensation in an acid medium.

10. A process for producing an infusible artificial resin which comprises dissolving without applying heat in an alkaline aqueous solution of formaldehyde, a sulphamide of a cyclic organic compound containing besides an unsubstituted sulphamyl group at least one group containing a substituted or unsubstituted NH₂, adding an acid content adequate to effect precipitation of a resinous body, separating the latter from the liquid, washing it out and hardening by the application of heat.

11. The process of producing a hardened resin-like condensation product which comprises reacting an aldehyde, an urea and a sulphamide of a cyclic organic compound which contains besides the sulphamyl group, a group containing a substituted or unsubstituted NH₂ radical.

12. A process for producing resin-like reaction products which comprises the step of condensing an aldehyde with a sulphamide of a cyclic organic compound containing at least besides one substituted or unsubstituted sulphamyl group (SO₂NH₂) a substituted or unsubstituted NH₂ radical or the NH₂ group itself, at least one of the sulphamyl or NH₂ groups being unsubstituted.

13. A process of producing resin-like reaction products which comprises the steps of condensing an aldehyde with a sulphamide of a cyclic organic compound in an alkaline medium to produce a product which can be hardened.

14. A process for producing an infusible artificial resin which comprises dissolving without applying heat in an alkaline aqueous solution of formaldehyde, a sulphamide of a cyclic organic compound containing besides one substituted or unsubstituted sulphamyl group (SO₂NH₂) a substituted or unsubstituted NH₂ radical or the NH₂ group itself, at least one of the sulphamyl or NH₂ groups being unsubstituted, adding an acid content adequate to effect precipitation of a resinous body, separating the latter from the liquid, washing it out, and hardening by the application of heat.

15. The process of producing a hardened resin-like condensation product which comprises reacting an aldehyde, an urea and a sulphamide of a cyclic organic compound which contains besides a substituted or unsubstituted sulphamyl group (SO₂NH₂) a substituted or unsubstituted NH₂ radical or the NH₂ group itself, at least one of the sulphamyl or NH₂ groups being unsubstituted.

16. A process for producing an infusible artificial resin which comprises dissolving without applying heat in an alkaline aqueous solution of formaldehyde, a sulphamide of a cyclic organic compound containing besides at least one substituted or unsubstituted sulphamyl group (SO₂NH₂) a group containing a substituted or unsubstituted NH₂ radical or a substituted or unsubstituted NH₂ group itself, at least one of the sulphamyl or NH₂ groups being unsubstituted, adding an acid content adequate to effect precipitation of a resinous body, separating the latter from the liquid, washing it out, and hardening by the application of heat.

17. The process of producing a hardened resin-like condensation product which comprises reacting an aldehyde, an urea and a sulphamide of a cyclic organic compound which contains besides at least one substituted or unsubstituted sulphamyl group (SO₂NH₂) a group containing a substituted or unsubstituted NH₂ radical, a substituted or unsubstituted or NH₂ group itself, at least one of the sulphamyl or NH₂ groups being unsubstituted.

18. A hardened resin-like condensation product obtained by reacting an aldehyde with a sulphamide of a cyclic organic compound containing besides at least one substituted or unsubstituted sulphamyl group (SO₂NH₂) a group containing a substituted or unsubstituted NH₂ radical or a substituted or unsubstituted NH₂ group itself, at least one of the sulphamyl or NH₂ groups being unsubstituted.

19. A hardened resin-like condensation product as defined in claim 23, wherein the sulphamide compounds contain beside the sulphamyl group, at least one carbamyl (CONH₂) group.

20. A resin-like product as defined in claim 23, wherein the condensation is carried out in the presence of an aldehyde binding substance selected from the following group:—phenols, urea, thiourea, amines and monamides.

21. A resin-like product as defined in claim 23, wherein the reacting sulphamide contains at least two unsubstituted sulphamyl groups.

22. An intermediate condensation product capable of being hardened resulting from the reaction of an aldehyde with a sulphamide of a cyclic organic compound containing besides an unsubstituted sulphamyl group, an additional group containing a substituted or unsubstituted $NH_2$.

23. A hardened resin-like condensation product obtained by reacting an aldehyde with a sulphamide of a cyclic organic compound containing besides an unsubstituted sulphamyl group, an additional group containing a substituted or unsubstituted $NH_2$ radical.

24. The hardened resin-like condensation product resulting from reacting an aldehyde an urea and a sulphamide of a cyclic organic compound which contains besides the sulphamyl group, a group containing a substituted or unsubstituted $NH_2$ radical.

25. A hardened resin-like condensation product obtained by reacting an aldehyde with a sulphamide of a cyclic organic compound containing besides a substituted or unsubstituted sulphamyl group ($SO_2NH_2$) a substituted or unsubstituted $NH_2$ radical or the $NH_2$ group itself, at least one of the sulphamyl or $NH_2$ groups being unsubstituted.

26. The hardened resin-like condensation product resulting from reacting an aldehyde, an urea and a sulphamide of a cyclic organic compound which contains besides a substituted or unsubstituted sulphamyl group ($SO_2NH_2$) a substituted or unsubstituted $NH_2$ radical or the $NH_2$ group itself, at least one of the sulphamyl or $NH_2$ groups being unsubstituted.

27. The hardened resin-like condensation product resulting from reacting an aldehyde, an urea and a sulphamide of a cyclic organic compound which contains besides at least one substituted or unsubstituted sulphamyl group ($SO_2NH_2$) a group containing a substituted or unsubstituted $NH_2$ radical or a substituted or unsubstituted $NH_2$ group itself, at least one of the sulphamyl or $NH_2$ groups being unsubstituted.

28. An intermediate condensation product capable of being hardened resulting from the reaction of an aldehyde with a sulphamide of a cyclic organic compound containing besides a substituted or unsubstituted sulphamyl group ($SO_2NH_2$), a substituted or unsubstituted $NH_2$ radical or the $NH_2$ group itself, at least one of the sulphamyl or $NH_2$ groups being unsubstituted.

GEORG WALTER.

Certificate of Correction

Patent No. 2,072,971.    March 9, 1937.

GEORG WALTER

It is hereby certified that errors appear in the printed specification of the above numbered patent requiring correction as follows: Page 3, second column, line 5, in the formula, for "$(S_2ONH_2)_3$," read $(SO_2NH_2)_3$; page 4, second column, lines 65, 68, and 73, claims 19, 20, and 21 respectively, for the claim reference numeral "23" read *18*; and that the said Letters Patent should be read with these corrections therein that the same may conform to the record of the case in the Patent Office.

Signed and sealed this 27th day of April, A. D. 1937.

[SEAL]

LESLIE FRAZER,
*Acting Commissioner of Patents.*

22. An intermediate condensation product capable of being hardened resulting from the reaction of an aldehyde with a sulphamide of a cyclic organic compound containing besides an unsubstituted sulphamyl group, an additional group containing a substituted or unsubstituted $NH_2$.

23. A hardened resin-like condensation product obtained by reacting an aldehyde with a sulphamide of a cyclic organic compound containing besides an unsubstituted sulphamyl group, an additional group containing a substituted or unsubstituted $NH_2$ radical.

24. The hardened resin-like condensation product resulting from reacting an aldehyde an urea and a sulphamide of a cyclic organic compound which contains besides the sulphamyl group, a group containing a substituted or unsubstituted $NH_2$ radical.

25. A hardened resin-like condensation product obtained by reacting an aldehyde with a sulphamide of a cyclic organic compound containing besides a substituted or unsubstituted sulphamyl group ($SO_2NH_2$) a substituted or unsubstituted $NH_2$ radical or the $NH_2$ group itself, at least one of the sulphamyl or $NH_2$ groups being unsubstituted.

26. The hardened resin-like condensation product resulting from reacting an aldehyde, an urea and a sulphamide of a cyclic organic compound which contains besides a substituted or unsubstituted sulphamyl group ($SO_2NH_2$) a substituted or unsubstituted $NH_2$ radical or the $NH_2$ group itself, at least one of the sulphamyl or $NH_2$ groups being unsubstituted.

27. The hardened resin-like condensation product resulting from reacting an aldehyde, an urea and a sulphamide of a cyclic organic compound which contains besides at least one substituted or unsubstituted sulphamyl group ($SO_2NH_2$) a group containing a substituted or unsubstituted $NH_2$ radical or a substituted or unsubstituted $NH_2$ group itself, at least one of the sulphamyl or $NH_2$ groups being unsubstituted.

28. An intermediate condensation product capable of being hardened resulting from the reaction of an aldehyde with a sulphamide of a cyclic organic compound containing besides a substituted or unsubstituted sulphamyl group ($SO_2NH_2$), a substituted or unsubstituted $NH_2$ radical or the $NH_2$ group itself, at least one of the sulphamyl or $NH_2$ groups being unsubstituted.

GEORG WALTER.

Certificate of Correction

Patent No. 2,072,971.  March 9, 1937.

GEORG WALTER

It is hereby certified that errors appear in the printed specification of the above numbered patent requiring correction as follows: Page 3, second column, line 5, in the formula, for "$(S_2ONH_2)_3$," read $(SO_2NH_2)_3$; page 4, second column, lines 65, 68, and 73, claims 19, 20, and 21 respectively, for the claim reference numeral "23" read *18*; and that the said Letters Patent should be read with these corrections therein that the same may conform to the record of the case in the Patent Office.

Signed and sealed this 27th day of April, A. D. 1937.

[SEAL]

LESLIE FRAZER,
*Acting Commissioner of Patents.*

Patent No. 2,072,971.

Certificate of Correction

March 9, 1937.

GEORG WALTER

It is hereby certified that errors appear in the printed specification of the above numbered patent requiring correction as follows: Page 3, second column, line 5, in the formula, for "$(S_2ONH_2)_2$" read $(SO_2NH_2)_2$; page 4, second column, lines 65, 68, and 73, claims 19, 20, and 21 respectively, for the claim reference numeral "23" read *18*; and that the said Letters Patent should be read with these corrections therein that the same may conform to the record of the case in the Patent Office.

Signed and sealed this 27th day of April, A. D. 1937.

[SEAL]

LESLIE FRAZER,
*Acting Commissioner of Patents.*